US012801717B2

(12) United States Patent
Tourani et al.

(10) Patent No.: US 12,801,717 B2
(45) Date of Patent: Nov. 17, 2026

(54) SYSTEMS AND METHODS FOR TWO-FACTOR AUTHENTICATION USING VIBRATION

(71) Applicant: Saint Louis University, St. Louis, MO (US)

(72) Inventors: Reza Tourani, St. Louis, MO (US); Eric Husa, St. Charles, MO (US)

(73) Assignee: Saint Louis University, St. Louis, MO (US)

( * ) Notice: Subject to any disclaimer, the term of this patent is extended or adjusted under 35 U.S.C. 154(b) by 784 days.

(21) Appl. No.: 17/846,297

(22) Filed: Jun. 22, 2022

(65) Prior Publication Data

US 2022/0414202 A1 Dec. 29, 2022

Related U.S. Application Data

(60) Provisional application No. 63/214,108, filed on Jun. 23, 2021.

(51) Int. Cl.

| | |
|---|---|
| ***G06F 21/40*** | (2013.01) |
| ***H04L 9/40*** | (2022.01) |
| ***H04W 12/06*** | (2021.01) |

(52) U.S. Cl.

CPC .......... *G06F 21/40* (2013.01); *H04L 63/0892* (2013.01); *H04W 12/06* (2013.01); *H04L 63/0838* (2013.01)

(58) Field of Classification Search

CPC ..... H04L 63/0838; G06F 21/34; G06F 21/40; G06F 21/30; G06F 21/31; H04W 12/06

See application file for complete search history.

(56) References Cited

U.S. PATENT DOCUMENTS 8,498,631 B2 7/2013 Li et al.
9,100,395 B2 8/2015 Herman et al.
(Continued)

FOREIGN PATENT DOCUMENTS

WO 20160141972 A1 9/2016

OTHER PUBLICATIONS

Acemyan, C.Z., et al., "2FA Might Be Secure, But It's Not Usable: A Summative Usability Assessment of Google's Two-factor Authentication (2FA) Methods," 2018, Proceedings of the Human Factors and Ergonomics Society Annual Meeting, 62(1):1141-1145, 5 pages.
(Continued)

*Primary Examiner* — Nasser M Goodarzi
(74) *Attorney, Agent, or Firm* — Brownstein Hyatt Farber Schreck, LLP

(57) ABSTRACT

A two-factor authentication system includes a mobile device having a vibration element configured to generate a vibration sequence based on a unique vibration code received by the mobile device. A two-factor authentication server is communicatively coupled to the mobile device and is configured to send the unique vibration code to the mobile device in response to the two-factor authentication server receiving a two-factor authentication request. A vibration receiver is configured to support the mobile device and communicatively coupled to the two-factor authentication server. The vibration receiver includes a vibration sensor configured to detect the vibration sequence generated by the mobile device based on the unique vibration code and generate a vibration authentication signal based on the detected vibration sequence. the two-factor authentication server is configured to receive the vibration authentication signal generated by the vibration receiver and authenticate the two-factor authentication request based on the received vibration authentication signal.

12 Claims, 7 Drawing Sheets

(56) References Cited

U.S. PATENT DOCUMENTS

| | | | | |
|---|---|---|---|---|
| 9,467,850 | B2 | 10/2016 | Deisher | |
| 9,949,124 | B1 | 4/2018 | Chen | |
| 2014/0020073 | A1* | 1/2014 | Ronda | H04L 63/0853 726/7 |
| 2015/0264569 | A1* | 9/2015 | Toyota | H04W 12/069 726/7 |
| 2016/0197914 | A1* | 7/2016 | Oberheide | H04L 63/0853 713/183 |
| 2018/0367944 | A1* | 12/2018 | Heo | G06F 1/163 |

OTHER PUBLICATIONS

Anand S.A., et al., "eCHOvIB: Exploring Voice Authentication via Unique Non-Linear Vibrations of Short Replayed Speech," 2021, Session 1B: Cyber-physical Systems, ASAI CCS '21, Virtual Event, Hong Kong, pp. 67-81, 15 pages.

Anand S.A., et al., "Noisy Vibrational Pairing of IoT Devices," 2018, IEEE Transactions on Dependable and Secure Computing, 16/3:530-545, 16 pages.

Backes, M., et al., "Compromising Reflections-or-How to Read LCD Monitors around the Corner," 2008 IEEE Symposium on Security and Privacy (sp 2008), pp. 158-169, 12 p.

Czeskis, A., et al., "Strength-ening user authentication through opportunistic cryptographic identity assertions," 2012, Proceedings of the 2012 ACM Conference on Computer and Communications Security, p. 404 414, 11 pages.

De Luca, A.D., et al., "Vibrapass: Secure Authentication Based on Shared Lies," ser. CHI '09. Association for Computing Machinery, 2009, p. 913-916, 4 pages.

Fauzi, M. A., et al., "Audiouth: Multi-factor Authentication Based on Audio Signal," 2020, Proceedings of the Future Technologies Conference. Springer, pp. 935-946, 12 pages.

Gunson, N., et al., "User Perceptions of Security and Usability of Single-Factor and Two-Factor Authentication in Automated Telephone Banking," 2011, Computers & Security, 30/4:208-220, 13 pages.

Halevi, T., et al., "Secure Proximity Detection for NFC Devices Based on Ambient Sensor Data," 2012, Computer Security -ESORICS, Springer Berlin Heidelberg, pp. 379-396, 18 pages.

Hirakawa, Y., et al., "PVRotate: An Improved Vibration-Based User Authentication Method," 2019, International Journal of Future Computer and Communication, 8/2:50-54, 5 pages.

Hufstetler, W., et al., "NFC Unlock: Secure Two-Factor Computer Authentication Using NFC," 2017, International Conference on Mobile Ad Hoc and Sensor Systems (MASS), IEEE, pp. 507-510, Abstract Only.

Huseynov, E., et al., "WifiOTP: Pervasive Two-Factor Authentication Using Wi-Fi SSID Broadcases," ITU / IEEE Kaleidoscope International Conference, 2015, http://archive-ouverte.unige.ch/unige:76795, 9 pages.

Jover, R., "Security Analysis of SMS as a Second Factor of Authentication: The Challenges of Multifactor Authentication Based on SMS, Including Cellular Security Deficiencies, SS7 eExploits, and SIM Swapping," 2020, ACMQueue, 18/4:37-60, 24 pages.

Karapanos, N., et al., "Sound-proof: Usable Two-Factor aAuthentication Based on Ambient Sound," 2015, 24th USENIX Security Symposium (USENIX Security 15), Washington, D.C.: USENIX Association, pp. 483-498, 24 pages.

Kroger, J.L., et al., "Is My Phone Listening In? On the Feasibility and Detectability of Mobile Eavesdropping," 2019, FIP Annual Conference on Data and Applications Security and Privacy, DBSec 2019, LNCS 11559, Springer, pp. 102-120, 19 pages.

Kuribara, T., et al., "Vibrainput: Two-Step Pin Entry System Based on Vibration and Visual Information," 2014, CHI 14 Extended Abstracts on Human Factors in Computing Systems, Association for Computing Machinery, pp. 2473-2478, 7 pages.

Au, J., et al., "Alexa, Are You Listening? Privacy Perceptions, Concerns and Privacy-Seeking Behaviors with Smart Speakers," 2018, Proceedings of the ACM on Human-Computer Interaction, 2/CSCW: 1-31, 31 pages.

Li, J., et al., "Velody: Nonlinear Vibration Challenge-Response for Resilient User Authentication," 11 2019, pp. 1201-1213, 13 pages.

Raguram, R., et al., "iSpy: Automatic Reconstruction of Typed Input from Compromising Reflections," 2011, Proceedings of the 18th ACM Conference on Computer and Communications security, pp. 527-536, 10 pages.

Ramani, S.K., et al., "Ndnviber: Vibration-Assisted Automated Bootstrapping of IoT dDevices," 2020, IEEE International Conference on Communications Workshops (ICC Workshops), pp. 1-6, 6 pages.

Redmiles, E., et al., "How I Learned to be Secure: a Census-Representative Survey of Security Advice Sources and Behavior," 2016, Proceedings of ACM SIGSAC Conference on Computer and Communications Security, pp. 666-677, 12 pages.

Roy, N., et al., "Ripple II: Faster Communication Through Physical Vibration," Mar. 2016, 13th USENIX Symposium on Networked Systems Design and Implementation (NSDI 16). USENIX Association, pp. 671-684, 15 pages.

Roy, N., et al., "Ripple: Communicating Through Physical Vibration," 2015, Presented in the Proceedings of the 12th USENIX Symposium on Networked Systems Design and Implementation (NSDI '15), Oakland, CA, USA, 15 pages.

Schürmann, D., et al., "Secure Communication Based on Ambient Audio," 2013, IEEE Transactions on Mobile Computing, vol. 12, No. 2, pp. 358-370, Abstract only.

Shi, C., et al., "Authentication of Voice Commands by Leveraging Vibrations in Wearables," 2021, IEEE Security & Privacy, 19/6, Abstract only.

Shirvanian, M., et al., "Two-Factor Authentication Resilient to Server Compromise Using Mix-Bandwidth Devices," 2014, NDSS '14, Internet Society, 16 pages.

Wang, M., et al., "Soundauth: Secure Zero-Dffort Two-Factor aAuthentication Based on Audio Signals," 2018, IEEE Conference on Communications and Network Security (CNS), IEEE, 2018, pp. 1-9, Abstract only.

Wilder, V., et al., "Multi-Factor Stateful Authentication Using NFC, and Mobile Phones," 2019 SoutheastCon., IEEE, pp. 1-6, Abstract only.

Xu, X., et al., "Touchpass: Towards Behavior-Irrelevant On-Touch User Authentication on Smartphones Leveraging Vibrations," 2020, Proceedings of the 26th Annual International Conference on Mobile Computing and Networking, London, UK, 13 pages.

* cited by examiner

Interval Analysis (optimized)

| | | | |
|---|---|---|---|
| 45ms - 0 | 125ms - 4 | 205ms - 8 | 285ms - C |
| 65ms - 1 | 145ms - 5 | 225ms - 9 | 305ms - D |
| 85ms - 2 | 165ms - 6 | 245ms - A | 325ms - E |
| 105ms - 3 | 185ms - 7 | 265ms - B | 345mx - F |

Example Mapping (optimized)

Plastic Stand

Wireless Charger

Flat Metal Surface

Elevated Metal Surface

SYSTEMS AND METHODS FOR TWO-FACTOR AUTHENTICATION USING VIBRATION

CROSS REFERENCE TO RELATED APPLICATIONS

This reference claims the benefit of U.S. Provisional Patent Application No. 63/214,108, filed Jun. 23, 2021, the entire disclosure of which is incorporated herein by reference.

FIELD

The present disclosure relates to two-factor authentication systems and methods.

BACKGROUND

The growing threats against online accounts, along with the vulnerabilities of password-only authentication systems, motivated the need for two-factor authentication (2FA). Traditional 2FA mechanisms were designed to utilize dedicated hardware tokens as the second authentication factor (known as "something you have"). In recent years, the pervasiveness and adoption of smartphones played a major role in replacing these hardware tokens with softwarized tokens that users receive on their smartphones. Using smartphones for authentication improves the usability of 2FA systems and reduces the manufacturing cost of hardware tokens. However, recent studies have found that approximately 28% of users have never attempted 2FA, with the primary reasons being the inconvenience and extra burden of interacting with the smartphone and security and privacy concerns of such systems.

In alleviating these challenges and augmenting 2FA usability, a few recent initiatives proposed zero-effort two-factor authentication mechanisms, which use the proximity of the user's smartphone with the computer as the second authentication factor. These mechanisms often use low-range communication technologies, such as Bluetooth and near-field communication, or audio signals to assess the proximity of the two devices. Nonetheless, these mechanisms either require device pairing, are vulnerable against co-located adversaries, or require unrestricted access to devices' microphones, posing serious privacy threats.

In earlier 2FA schemes such as RSA SecureID1, users had to use custom devices for generating new codes for each login attempt—proving the possession of the hardware. However, the inconvenience of carrying an extra device, its limited lifetime, and the possibility of being lost or stolen adversely impacted the popularity of these devices. More advanced hardware-based token generator devices such as YubiKey2 has emerged to address these challenges by plugging the device into the user's computer. During the login attempt, the user taps the device to prove their authenticity. Despite its simplicity, such systems require the user to carry an extra device. These challenges motivated the advent of software-based tokens.

The common practice in software-based tokens 2FA schemes entails the authentication service to provide a software token to the user via email, short message service (SMS), or an authentication application. Software-based 2FA schemes have been shown to be more convenient than prior approaches in obtaining and consuming the tokens. However, sharing tokens using SMS could be intercepted over the air or through the SIM-swapping attack. Authenticator applications, such as Authy3 and Google 2-Step Verification4, have shown to be more robust and user-friendly when compared to SMS and email. These applications, however, require the user to enter the received one-time code manually. A few recent initiatives attempted to reduce the expected user interaction by devising a one-click button for accepting or rejecting a login attempt. Nonetheless, these applications still require user interaction.

Improving the traditional 2FA schemes, various approaches proposed using short range communication technologies, such as Bluetooth and WiFi, to prove the proximity of devices. PhoneAuth devises a challenge-response identification process between the user's device and phone over a short-range Bluetooth connection. However, using Bluetooth requires device pairing and is vulnerable to co-located attackers who attempt to hijack the authentication session. It has been shown using WiFi for proving device proximity in the authentication process is faster than Bluetooth. WiFiOTP proposes a contactless 2FA system over WiFi that is not restricted to network sharing. In WiFiOTP, an SSID is constantly broadcasted containing the encrypted one-time password. However, using WiFi for proximity verification either requires the devices to be on the same network, which is a highly restrictive as smartphones are often connected to cellular networks, or demands a dedicated wireless access point for constant token broadcasting.

A few initiatives have used audio signals for zero-effort authentication. It has been proposed to compare the user's computer and phone environments' ambient audio footprint to validate their proximity. However, these methods fail in the presence of co-located attackers, or when the attacker triggers a known audio signal (e.g., a ringtone) in the recording phase. Moreover, these methods require permission to remotely trigger devices' microphones—posing a serious privacy threat. Alternative proposals have emerged, which verify the similarity of an authentication sound generated by the computer and recorded by the phone or using a visual representation of an audio signal. Nonetheless, these methods fail with plugged-in headphones, cause an annoyance to users or certain environments, and are vulnerable to co-located attackers.

Using vibration in transmitting extensive amounts of data have been explored in Ripple. In Ripple, the authors devised an ecosystem with customized hardware, which provides a great deal of flexibility in tuning parameters such as vibration frequency and amplitude. In the security domain, a few works proposed using the combination of vibration and physiological characteristics of human hands for user authentication. It has been proposed that a secure user interaction technique, in which vibration distortion signals the user when to take a unique action. In addition, vibration has been used in the secure pairing of IoT devices, even in the presence of acoustic eavesdroppers, and authenticating voice commands in voice-assisted systems using wearable devices.

SUMMARY

In contrast to these schemes described above, the systems and methods described herein provide a secure and reliable 2FA mechanism, which uses vibration signals as the second authentication factor. To address the shortcomings described above and promote 2FA usability and resiliency, the systems (i.e., Vibe) and methods described herein are directed to an implicit 2FA system that eliminates the need for user-device interaction, runs on commodity smartphones, and is secure against co-located adversaries. The systems and methods described herein use a short-range vibration communication to prove the proximity of the user's smartphone and computer. During a login attempt, a remote two-factor authentication server sends a one-time code to the user's smartphone, which in turn, transmits it to the computer using a shared physical medium. The web browser on the receiving computer records and forwards the vibration signal back to the remote two-factor authentication server for signal processing and authentication verification.

The systems and methods described herein address the security vulnerabilities and privacy threats of the existing zero-effort 2FA schemes. First, the majority of the 2FA mechanisms that use audio signals for proximity assessment are vulnerable to targeted attacks, in which a co-located adversary with the knowledge of the user's credentials tries to log in on the user's behalf. The systems and method described herein effectively thwarts this threat by reducing the attack surface to the physical surface, shared between the user's devices. Hence, the co-located adversaries without access to the shared surface cannot orchestrate their attacks. Second, audio-based 2FA mechanisms require access to the devices' microphones to record the ambient noise or the audio signals played by other devices. It has been shown that nonrestrictive microphone access allows the devices to continuously listen to the users without their consent—posing serious privacy concerns. In protecting users' privacy, the systems and methods described herein do not require access to microphone, users' biometric, or camera feed.

The systems and methods described herein describe an implicit 2FA mechanism that uses the proximity of devices as the second authentication factor through a short-range vibration communication.

The systems and methods described herein provide security at the physical layer by reducing the attack surface to the physical surface shared by the user's devices. Thus, protecting the user from co-located adversaries.

In one aspect, a two-factor authentication system generally comprises a mobile device having a vibration element configured to generate a vibration sequence based on a unique vibration code received by the mobile device. A two-factor authentication server is communicatively coupled to the mobile device. The two-factor authentication server is configured to send the unique vibration code to the mobile device in response to the two-factor authentication server receiving a two-factor authentication request. A vibration receiver is configured to support the mobile device and is communicatively coupled to the two-factor authentication server. The vibration receiver includes a vibration sensor configured to detect the vibration sequence generated by the mobile device based on the unique vibration code and generate a vibration authentication signal based on the detected vibration sequence. The two-factor authentication server is configured to receive the vibration authentication signal generated by the vibration receiver and authenticate the two-factor authentication request based on the received vibration authentication signal.

In another aspect, a vibration receiver for a two-factor authentication system that authenticates via a vibration sequence generated by a mobile device generally comprises a vibration support surface configured to support a mobile device. The vibration support surface comprises a vibration medium configured to convey the vibration sequence generated by the mobile device. A vibration sensor engages the vibration support surface such that the vibration sensor receives the vibration sequence generated by the mobile device and conveyed by the vibration medium of the vibration support surface. The vibration sensor is configured to generate a vibration authentication signal based on the received vibration sequence.

In yet another aspect, a two-factor authentication method generally comprises receiving, by a two-factor authentication sever, a two-factor authentication request. Sending, by the two-factor authentication server, a unique vibration code to a mobile device. Receiving, by a vibration receiver, a vibration sequence generated based on the unique vibration code. Generating, via the vibration receiver, a vibration authentication signal based on the vibration sequence. Receiving, by the two-factor authentication server, the vibration authentication signal. Authenticating, via the two-factor authentication server, the two-factor authentication request based on the vibration authentication signal.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
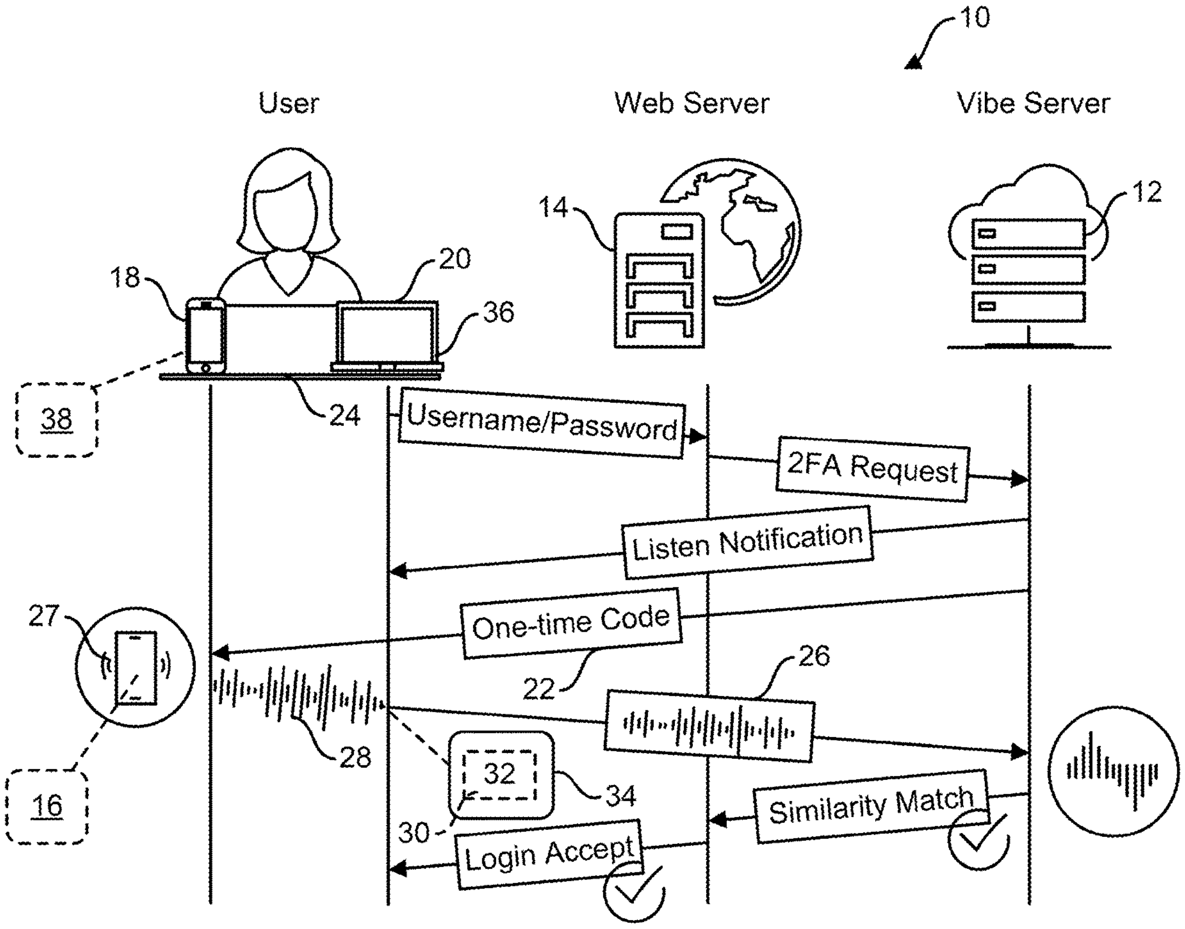
FIG. 1 is a schematic illustration of a two-factor authentication system including user's devices (smartphone and computer) sharing a surface, a web server hosting the protected web page, and a server hosted on the Cloud.

Referring to FIG. 1, a two-factor authentication system (i.e., Vibe) of the present disclosure is generally indicated at 10. The system realizes a three-party architecture, including a two-factor authentication server or service 12 (i.e., a Vibe server or service), a web server 14, and users aiming at accessing the web server's resources following a browser-based web authentication. The two-factor authentication system 10 is composed of the back-end or two-factor authentication server 12 (Vibe's server), which runs on the Cloud, and a front-end application 16 (i.e., Vibe's application), which runs on the users' smartphones 18 as an Android or iOS application. The two-factor authentication system 10 includes each user possessing two devices. A primary device 20 (e.g., the user's computer) is the one on which the user enters their credential into a browser to log into the web. The secondary device is the user's smartphone 18, running the Vibe's application 16.

Initially, the web server 14 registers with the two-factor authentication system 10 to enable the two-factor authentication service 12 for protecting its resources. Upon service registration, the web server's users install the Vibe's application 16 on their smartphones 18. To access the web server's resources, each user must authenticate themselves to the web server 14 using their username and password—completing the first authentication factor (FIG. 1). On successful authentication, the web server 14 requests the two-factor authentication system 10 to perform a challenge-response process with the authenticated user. The challenge-response process involves the Vibe's server 12, the Vibe's application 16, and the user's computer 20, through which the user proves the possession of the authentication devices and satisfies the second authentication factor.

At a high level, the two-factor authentication system's process begins with a user's attempt to log into a protected web page using their credentials. With valid credentials, the web server 14 requests the Vibe service 12 for executing the second authentication factor. Subsequently, the Vibe's server 12 securely shares a one-time code 22 with the user's smartphone 18, which in turn, transmits it to the user's computer 20 using a vibration communication medium 24. The web browser on the user's computer 20 sends a vibration signal 26 to the Vibe's server 12 for signal processing and similarity check. Finally, the Vibe's server 12 shares the user's authentication result with the web server 14.

In one embodiment, the two-factor authentication system 10 follows a rudimentary one-time code generation process, in which the Vibe's server 12 generates a random binary string of a pre-defined length. The code 22 includes a preamble for synchronization purposes between the user's devices 18, 20 and a secret for authentication purposes. The Vibe's server 12 then securely shares the generated one-time code 22 with the Vibe's application 16 running on the smartphone 18. Using on-off keying, a form of amplitude-shift keying modulation, in this embodiment a 0-bit indicates a fixed idleness period and a 1-bit indicates a fixed vibration period; which may both be 150 milliseconds. The smartphone 18 modulates the received one-time code 22 and transmits it to the computer 20 over the vibration medium 24 using a vibration element 27. To accurately detect the consecutive vibration periods, a fixed idle period of roughly 50 milliseconds—negative buffer—is preferably placed after every bit. The negative buffer allows the smartphone's vibration motor to taper off before ramping up for the next vibration period.

On the receiving side, the web browser on the user's computer 20 senses the shared surface to collect a vibration sequence 28 transmitted by the user's phone 18 by the vibration element 27. In one embodiment, a vibration receiver 30 including a vibration sensor 32 is operatively coupled to the computer 20 and receives the vibration sequence 28. For example, a USB connector 34 configured to connect to a USB port 36 of the computer 20 may communicatively couple the vibration receiver 30 to the computer. The user's computer 20, via the vibration sensor 32, then securely transmits the received sequence 28 as the vibration signal 26 to the Vibe's server 12. The Vibe's server first normalizes the raw signal using a moving average window to remove the jitters and transform it into a usable waveform. The Vibe's server 12 then transforms the normalized signal to the frequency domain using Cooley-Tukey fast Fourier transformation (FFT).

Figure 2A:
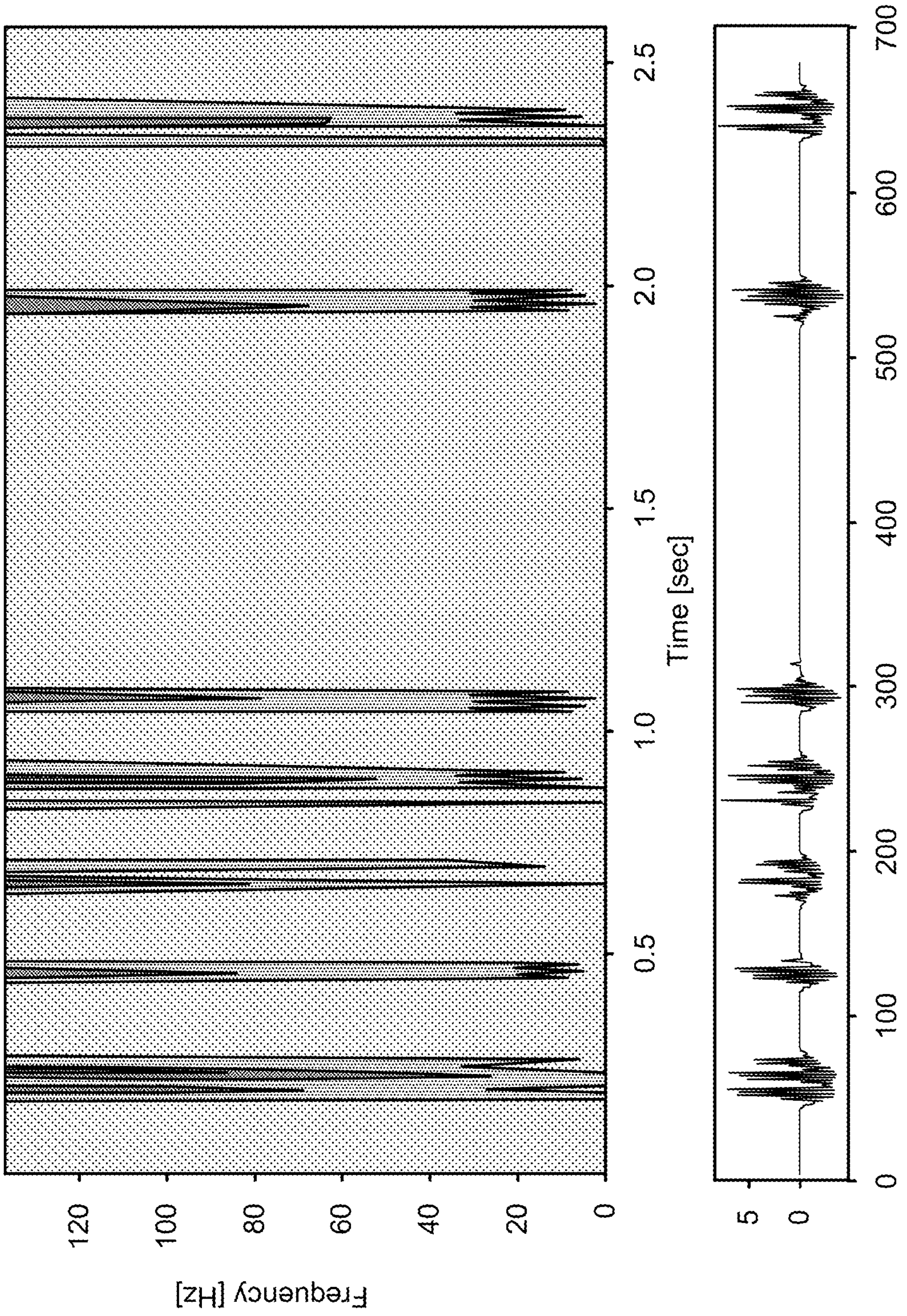
FIG. 2A is a spectrogram visualizing the frequency range (20 Hz to 150 Hz) observed in the transformed signal.
Figure 2B:
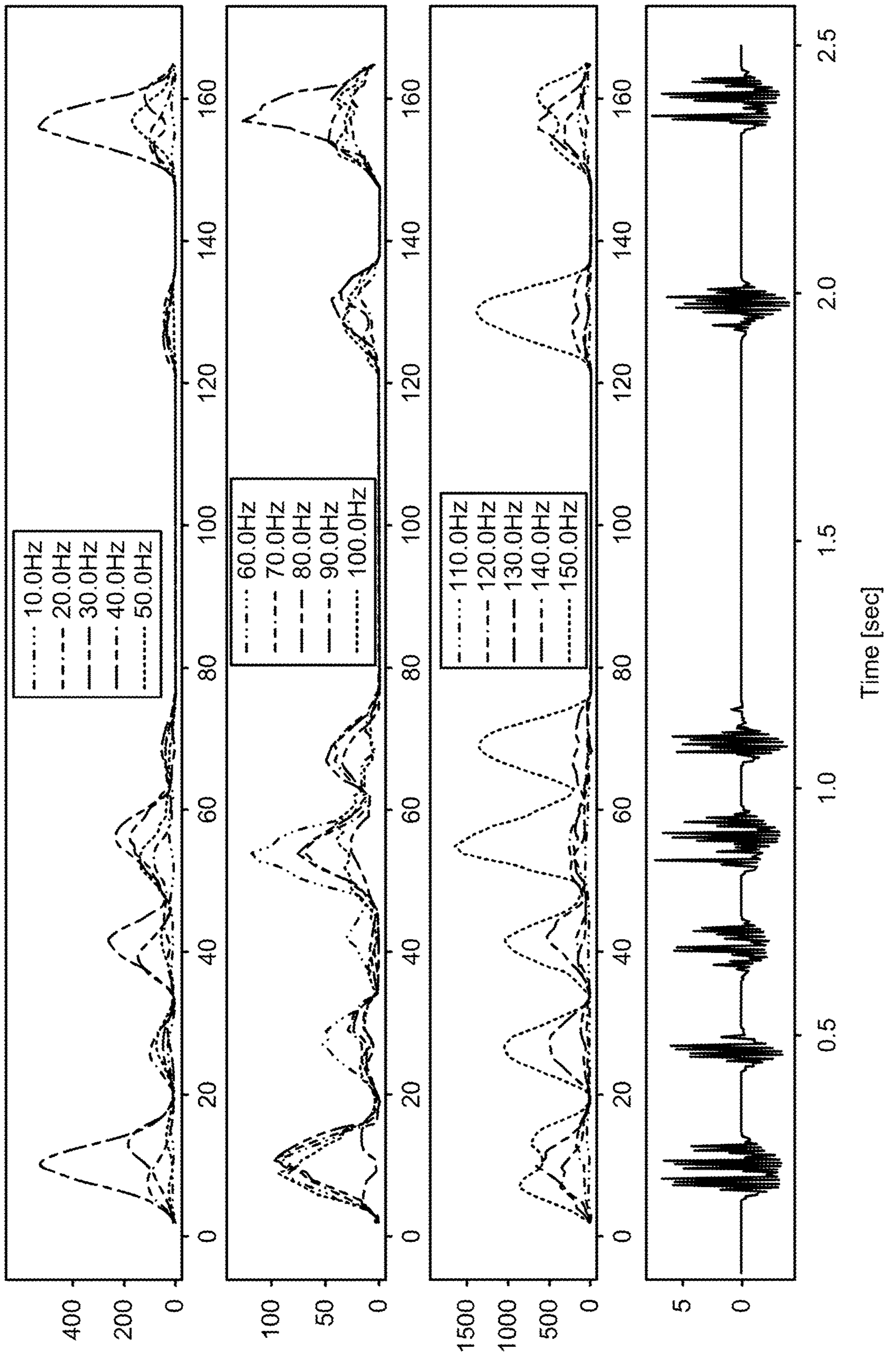
FIG. 2B is a frequency separation and band-pass filtering for eliminating irrelevant frequency bands from an original signal sent to the server (binary string 11111000101).
Figure 2C:
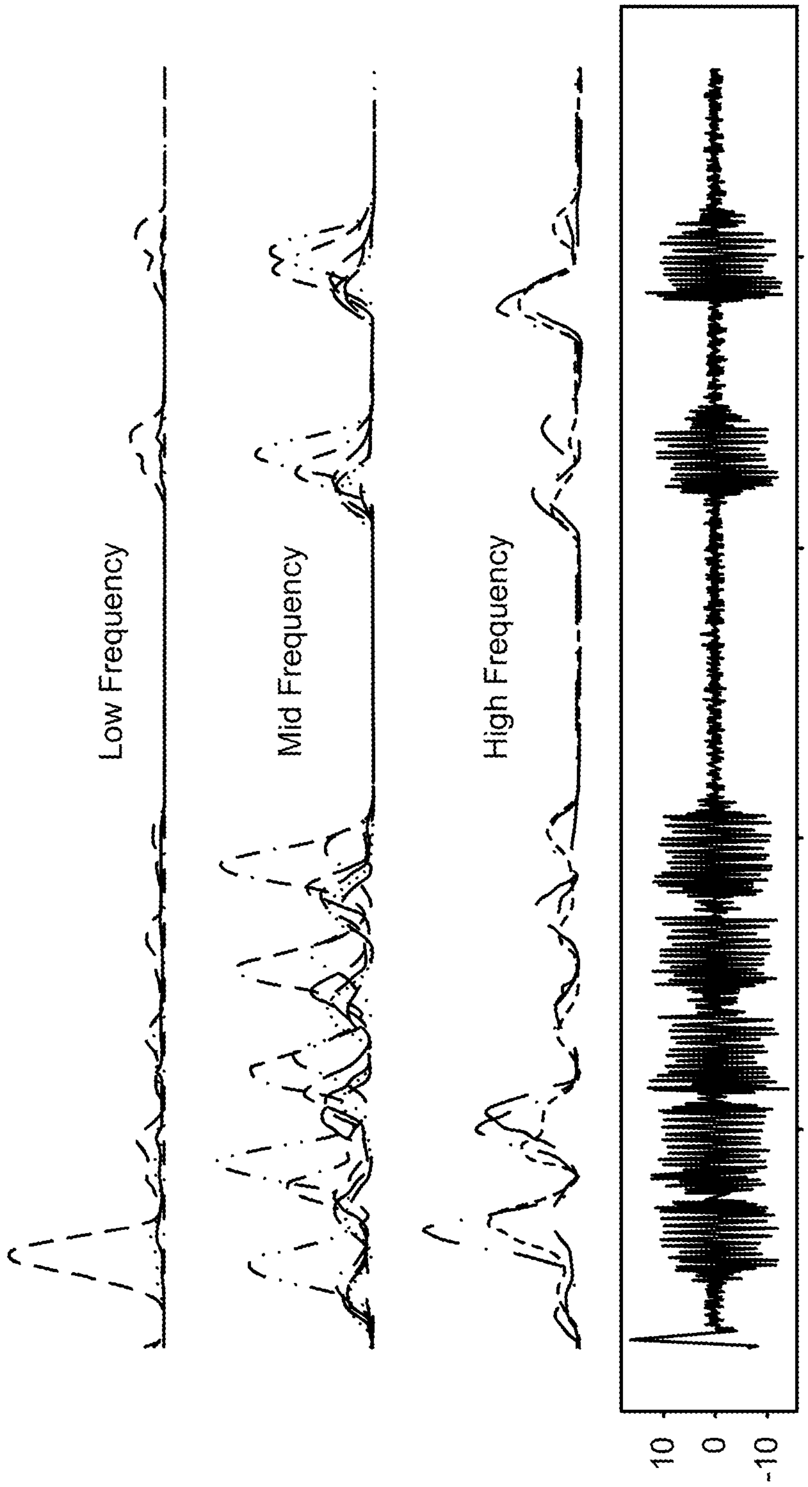
FIG. 2C are frequency separation and band-pass filtering to eliminate irrelevant frequency bands from the original signal sent to the server.

After FTT, the Vibe's server 12 performs frequency separation, aiming to create three frequency bands (FIG. 2C) and uses a band-pass filter to eliminate low and high frequency bands. A wide frequency range, from 20 Hz to 150 Hz (FIG. 2A), is shown in the transformed vibration signal, which along with the ambient noise, complicates the processing of vibration signals in Vibe. To address this, Vibe splits the observed frequency range into three frequency bands (FIGS. 2B and 2C) and uses a band-pass filter to eliminate low- and medium-frequency bands. Typically, a smartphone's vibration motor starts the vibration at a high-frequency range and converges to a medium-frequency range when it reaches the maximum revolutions per minute. Eventually, the motor transitions to the low-frequency range as it reaches the steady-state (constant vibration). Preferably, the two-factor authentication system 10 sets the vibration length to the minimum measurable period to increase the transmission throughput, resulting in the vibration motor barely reaching the steady-state, eliminating the low-frequency range (FIGS. 2B and 2C). Moreover, the medium-frequency range vanishes in scenarios where the code 22 includes multiple consecutive 1-bits. Thus, the two-factor authentication system 10 preferably uses the medium- or high-frequency ranges for code extraction.

The next step of code extraction is peak detection. The Vibe's server 12 uses the signal's preamble for synchronization and bit-space calculation. In this context, bit-space is defined as the time required to present one bit. For detecting vibration occurrences (1-bits), the peak detection algorithm identifies the local maxima points on the one-dimensional processed signal. In detecting the 0-bits, Vibe's server 12 uses the identified peaks to measure the elapsed time between every pair of consecutive peaks and uses the bit-space to calculate the number of 0-bits between the two referenced peaks. Finally, Vibe's server 12 regenerates the received code as a binary string and compares it with the original code using Hamming similarity.

In this embodiment, the two-factor authentication system's approach is low bandwidth as each vibration event represents one bit, resulting in a high end-to-end latency. Moreover, this embodiment requires processing the received signal 26 in the frequency domain, which can be challenging when considering the lack of proper vibration APIs in the existing smartphones.

Figures 3A, 3B:
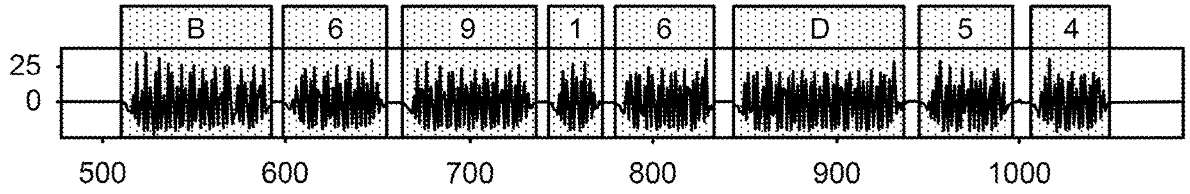
FIG. 3A is an interval analysis for extracting a one-time code.
FIG. 3B is a map of a vibration signal split into temporal intervals where each interval is mapped to a hexadecimal character, using a length mapping.

In another embodiment, the two-factor authentication system 10 remedies these challenges. In this embodiment, the two-factor authentication system 10 employs character-wise code generation, which contrasts the bit-wise codes described above, and uses data modulation in the time domain. To initiate the system 10, Vibe's server 12 selects a coding scheme, such as Hexadecimal or ASCII coding, with an alphabet size of P. For example, the coding scheme used can be Hexadecimal coding (P=16). The Vibe's server 12 then generates a random lookup table to map each character of the alphabet to a vibration period, and subsequently shares the lookup table with the user (FIG. 3B). For a 2FA attempt, the Vibe's server 12 generates a randomized N-character one-time code 22 and securely shares it with the Vibe's application 16. On receiving the code 22, Vibe's application 16 uses the pre-shared lookup table to modulate the code into a vibration period and emanates the vibration, including a negative buffer between characters. Note that Vibe's server 12 can use per-user lookup table to augment the systems' security, described below.

On the receiving side, in this embodiment the user's computer 20, via the vibration receiver 30 and vibration sensor 32, collects the raw signal (sequence 28) from the vibration transmission medium 24 and securely shares it (as signal 26) with the Vibe's server 12 for signal processing and similarity analysis. The Vibe's server 12 first identifies the non-idle periods in the normalized data and split them into a set of disjointed vibration data point series to extract the one-time code (FIG. 3A). Considering that these data points are not represented in a unit of time, the Vibe's server 12 extracts temporal estimates of vibration patterns from the disjointed data points using Equation 1 shown below. Given a known temporal series representation (E) of an N-character one-time code (generated using the lookup table) and a series of processed vibration data point periods (R) corresponding to the same code, per character representations from each series are compared and averaged to find a sole value for the estimated relationship between single data points and time. The values in series R are converted into temporal estimates by scaling them with the newly estimated ratio of data points to time. Thus, the final estimate for each single character vibration (Cu) in the N-character code is computed by:

$$Cv = \frac{Rv}{N}\Sigma_{i=1}^{n}\frac{E_i}{R_i} \quad (1)$$

Vibe's server 12 uses the set of calculated vibration duration series and the originating lookup table for each series' length to extract the received code U. Since the calculated durations are expected to be imprecise, in the two-factor authentication system 10, each value is heuristically matched to an entry in the lookup table by rounding the duration to the closest match. For the shortest and longest duration in the mapping, those leniently matched recordings that fall below the shortest vibration duration as the shortest and those that are above the longest vibration duration as the longest. Given the original code (O) and the resultant code (U) of length N, the code distance (D(O, U)) is defined as the summation of character-wise differences between the corresponding characters of O and U (Equation 2).

$$D(O, U) = \sum_{i=0}^{n} O_i - U_i \quad (2)$$

For instance, using Hexadecimal coding, the code distance between O=E5C and U=B5D will be D(O, U)=4. Using the code distance, the similarity score (Sim(O, U)) of (U) and (O) is defined as in Equation 3. In particular, the code distance is normalized using the code's bit-length (L) and then calculate the similarity score as its complement. Note that a U that is very different from O (e.g., O=FFF and U=000) leads to a normalized distance bigger than 1, which results in a negative similarity score. Thus, in Equation 3, the maximum of the calculated value and 0 is taken. The intuition for the similarity score is imposing harsher penalties for differences in the codes and reducing the two-factor authentication system's false positive rate.

$$Sim(O, U) = \max\left(1 - \frac{D(O, U)}{L}\right), 0 \quad (3)$$

Considering the ambient noise in the environment, the collected signals introduce higher noise-to-signal ratios, demanding a more advanced data processing. Thus, in this embodiment, Vibe's server 12 auto-adjusts its pre-set threshold of the idle period to detect characters' boundaries and split a signal into individual data points. It enables Vibe's server 12 to automatically repeat the signal splitting process if the number of resultant recordings does not match the expected number of characters in the code. This embodiment improves the communication bandwidth and authentication latency of the earlier described embodiment. This embodiment is described using Hexadecimal coding is for simplicity and illustrative purposes—the two-factor authentication system 10 can adopt various encoding schemes such as ASCII without major modifications.

In the following paragraphs, the two-factor authentication system properties, including its zero-effort nature, deployment simplicity, and reliability are discussed. Before these discussions, significant differences between the two-factor authentication system 10 and other schemes using vibration in the context of communication or human-computer interaction are elaborated on. Using vibration for high bandwidth communication often requires customized hardware that provides flexibility in terms of vibration frequency and amplitude. In contrast to customized hardware, most of the existing off-the-shelf smartphones feature simple vibration motors with restrictive APIs—increasing the application development complexity. Moreover, the two-factor authentication system 10 contrasts those approaches that use vibration for haptic communication and human-computer interaction as it uses vibration for device-to-device communication. The two-factor authentication system 10 offers a compelling use case with unique challenges that are addressed herein.

The two-factor authentication system prototype implementation demonstrated its suitability for the 2FA use case in terms of user-perceived latency, performance consistency across multiple vibration mediums, and attacks resiliency in the presence of co-located adversaries.

Similar to the zero-effort 2FA techniques that use audio signals, the two-factor authentication system 10 does not require user intervention during the authentication process. Vibe's application 16 runs in the background of the user's smartphone 18 and implicitly interacts with the user's computer 20 for each login attempt. The only requirement for Vibe's success is the existence of a shared surface 24, which is common in many scenarios, such as office settings where the user's computer 20 and smartphone 18 are placed on the same desk. Using such a shared surface 24 implicitly verifies the proximity of the two devices 18, 20 and enforces the 2FA scheme.

In one embodiment, a wireless charger 38 is configured to wirelessly charge the smartphone 18 while the smartphone is supported by the vibration support surface 24.

To provide an adoptable design without the need for customized hardware, off-the-shelf smartphone and computer in prototyping were used in the two-factor authentication system 10. A Luvay piezoelectric disc and an Arduino Uno were used to collect vibration signals—primarily due to the lack of a viable API for using the computer's available sensors. Note that the majority of the existing computers (e.g., tablet and gaming laptops) already have embedded vibration sensors, such as gyroscope, accelerometer, and sudden motion sensor. Moreover, with the increasing popularity of wireless chargers, a charging/docking platform on a computer desk equipped with a piezo sensor is also possible. Note that the majority of the audio-based 2FA mechanisms require the users to remove their headphones from their smartphones. In contrast, the two-factor authentication system 10 does not impose any such restrictions, which enhances its usability.

In terms of security and privacy, the two-factor authentication system 10 out-performs the existing zero-effort 2FA schemes. Contrasting the existing zero-effort 2FA schemes that are vulnerable to co-located adversaries, the two-factor authentication system 10 effectively prevents these attackers from getting access to the protected resources. As discussed above, even if the attackers share the environment/surface with the user, they cannot successfully perform a malicious authentication since the user's unique vibration lookup table remains private. Moreover, propagation of the vibration sequence 28 requires a physical surface, which provides security at the physical layer and reduces the attack surface to the actual physical surface. Another security benefit of the two-factor authentication system 10 is that it will notify the user of any login attempt, which allows timely remedial action. Finally, a few of the zero-effort 2FA approaches require the user's smartphone and computer to record the ambient sound. These solutions violate the user's privacy since the front-end application requires permission to access the device's microphone, allowing a malicious application to record surrounding sounds continuously.

Security Analysis

In this work, it is assumed that the adversary has obtained the victim's valid account credentials (the username and password) either through password file leakage or spear-phishing attacks. The adversary's objective is to fraudulently authenticate himself on the victim's behalf, accessing the victim's account. To do so, the adversary visits the web page using the victim's credential. Without a 2FA scheme, this attack will be successful, and the adversary gets access to the protected resources. To successfully orchestrate the attack in when the web server 14 uses the two-factor authentication system 10 disclosed herein, the adversary must convince Vibe's authentication server 12 of possessing the second authentication factor (victim's smartphone). Thus, the adversary has to either fabricate their response to the 2FA challenge or compromise the victim's smartphone 18.

However, it is assumed that the adversary cannot compromise the victim's smartphone 18. Note that the security of all 2FA schemes relies on the security and tamper-resistance property of the device that acts as the second authentication factor (the victim's smartphone 18). Without this assumption, any 2FA scheme will be as secure as the victim's password. Similarly, it is assumed that the adversary cannot hold possession of the victim's smartphone 18—the adversary with the victim's smartphone possession could bypass any 2FA scheme. Finally, it is assumed that the adversary cannot orchestrate a Man-In-The-Middle attack (MITM)5 on the victim's browser to intercept the victim's authentication session. More specifically, the adversary cannot compromise the victim's computer 20. MITM and spear-phishing attacks are out of the scope of this system.

In contrast to other 2FA mechanisms that fail in the presence of co-located adversaries, the two-factor authentication system 10 discloses herein does not rely on the adversary's location. Thus, scenarios are considered in which the adversary may orchestrate the attack either remotely or from the same location as the victim. It is understood that eliminating the co-location assumption is one of the significant contributions of the two-factor authentication system 10 disclosed herein as the number and sophistication of targeted attacks from co-located adversaries are growing, undermining the security of a large number of existing 2FA mechanisms.

A. Remote Adversary

For a remote attack to be successful, the adversary should intercept the communication between the Vibe's server 12 and application 16 to obtain the one-time code 22 and produce the vibration pattern. Considering the secure communication between these entities (over TLS or HTTPS), the remote adversary will fail to extract the one-time code 22 from the intercepted communication. The Vibe server 12 can securely assign a random vibration lookup table to each user and frequently update the table to increase the system's entropy. Using randomized tables prevents the adversary who successfully extracted the one-time code 22 from generating the correct vibration pattern. For a successful attack, the adversary needs to obtain the user's unique vibration lookup table in addition to the intercepted code 22, which is not practical considering the two-factor authentication system's security assumptions, described above.

B. Co-Located Adversary

In contrast to the majority of the existing zero-effort 2FA mechanisms that fail in the presence of co-located adversaries, the two-factor authentication system 10 of the present disclosure prevents such adversaries from successfully orchestrating the attack. A co-located adversary that does not share the surface with the user may attempt to overhear the vibration and replay it. Such an attack would be successful only if (i) the user's smartphone 18 is on a surface, (ii) the user's smartphone vibration results in a perceptible sound, and (iii) the adversary is equipped with a sensitive microphone that can collect the vibration sound. In the two-factor authentication system 10, the smartphone 18 generates a low-amplitude vibration, which along with the ambient noise in the environment, results in a high noise-to-signal ratio at the adversary's microphone—making such attacks impractical.

C. Co-Located Adversary with Shared Surface

In an alternative scenario, consider a co-located adversary that shares the surface with the user. For this attack to be successful, the adversary must place a sensitive vibration sensor near the user's smartphone 18 on a shared surface 24. It is the only scenario that a successful attack can be orchestrated against the two-factor authentication system 10. However, this attack's success requires a capable adversary who is aware of the user's location and can share the surface with the user during the attack. Such an adversary can successfully compromise other relevant 2FA schemes such as those that use audio signals and ambient, Bluetooth, or near field communication. It is noteworthy that the successful orchestration of such an attack notifies the user due to smartphone vibration on the authentication attempt. Thus, allowing the user to take remedial actions.

D. Random-Precision Attack

For a random-precision attach, the two-factor authentication system's security is accessed in the presence of an adversary that can generate a one-time code with a certain accuracy—similarity to the original code. Considering an original one-time code 22 of length N characters, generated from an alphabet of size P, the upper bound probability of generating an arbitrary code that differs no more than B bits from the original code is defined in Equation 3 above. Note that, whenever possible, it is assumed the B bits difference is evenly distributed among the N characters of the code. This results in each character of the arbitrary code to be different from the corresponding character of the original code by B/N bits. The rationale for this assumption is to derive the upper bound probability of the arbitrary code being similar to the original code, which leads to a stronger attack.

TABLE I

THE PROBABILITY OF THE ADVERSARY SUCCESSFULLY GENERATING A RANDOM CODE WITH CERTAIN ACCURACIES

| 25% Accurate | 50% Accurate | 75% Accurate |
|---|---|---|
| $1.34 \times 10^{-5}$ | $9.09 \times 10^{-5}$ | $1.53 \times 10^{-5}$ |

In calculating this upper bound probability, the denominator (P) represents all possible choices for a given character while the numerator represents the number of those acceptable choices. Given that B is not always divisible by N, it is often the case where the bit-wise difference between characters in the original and arbitrary code are not identical. In such cases, there is a number of characters (N−ε) that are closer to their original counterparts than other characters (ε). In contrast, when B is divisible by N, all the characters of the code 22 are treated in the same way in the same way (ε=0), resulting in the first component of Equation 4 below to be one.

$$\left(\frac{2\frac{B}{N}+1}{P}\right)^{\varepsilon}\times\left(\frac{2\frac{B}{N}-2\frac{\varepsilon}{N}+1}{P}\right)^{N-\varepsilon},\ (\varepsilon = B\bmod N). \tag{4}$$

In the evaluation of this attack, a one-time code 22 of 8 characters (N=8) selected from an alphabet of size 16 characters (hexadecimal coding where P=16) is considered. Table I summarize the three scenarios. The likelihood of the adversary generating a code that is at least 25% accurate (bit-distance between the original and generated code being B=24) is $1.34\times10^{-5}$, which represents a scenario where each character in the adversary's generated code is off by 3 bits from the original code. The likelihood of the adversary generating a 50% accurate code (B=16) is $9.09\times10^{-5}$, representing each character in the adversary's generated code to be off by 2 bits from the original code. Finally, the likelihood of the adversary generating a 75% accurate code (B=8) is $1.53\times10^{-6}$, representing the generated code to be off by 1 bit.

EXPERIMENTAL RESULTS

A two-factor authentication system 10 according to the present disclosure was implemented and tested as follows.

A. Implementation Scope

Referring back to FIG. 1, the reference implementation of the two-factor authentication system 10 comprises three components: the Vibe's server engine 12, the Vibe's smartphone application 16, and the web server 14 that hosts the web page and a web application for the computer 20 and server engine interaction. The server engine 12 is implemented in Python, running Flask (v1.1.2), and uses Numpy (v1.19.1) and Pandas (v1.1.1) for data formatting and signal processing. Amazon EC2 was used in the experiments to host the server engine, which contains public endpoints for the Vibe's application 16 and the web server 14. The Vibe's application 16 was implemented on Android using the android.os.VibrationEffect class for controlling the phone's vibration motor. The web server 14 was hosted on Amazon EC2. It contains a standard login web page and a JavaScript web application running NodeJS (version 14.15.4), which uses the WICG Web Serial API to allow the web page access the serial port of the host. Upon the web server's request for the Vibe's service 12, the server engine sends the one-time code 22 to the Vibe's application 16 and instructs the web application (running on the computer 20) to access the serial port for recording the vibration sequence 28. On vibration completion, the web application processes the recording signal 28 and forwards it to the server engine 12 as vibration signal 26. Finally, the server engine 12 shares the authentication result with the web server 14. This application was tested on the Google Chrome browser (version 87) with the experimental web platform features flag enabled.

B. Experimental Setup and Metrics

B.1—Testbed Setup: For the experiments, a testbed was built using an LG V30 smartphone, a MacBook Pro laptop, an Arduino Uno, and a Luvay 27 mm piezoelectric disc (piezo sensor). The smartphone rans Android version 8.0.0 (Oreo), using Android API level 26, and features the manufacturer's OEM vibration motor for generating the vibration signal. The laptop rans macOS Catalina v10.15.7. On the receiver side, a piezo sensor was connected to an Arduino Uno, which was connected to the laptop. The piezo sensor collected the vibration signal at 9.6 Kbps and transmitted it to the laptop's serial port via Arduino. The web application on the laptop sent the analog reading to the Vibe's server. For simplicity, the piezo sensor and Arduino connected to the MacBook Pro was used (described in more detail below).

Figure 4A:
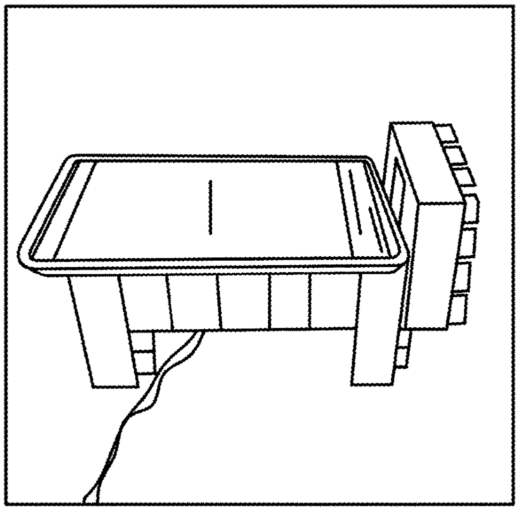
FIG. 4A-D are illustrations of the vibration mediums.
Figure 4B:
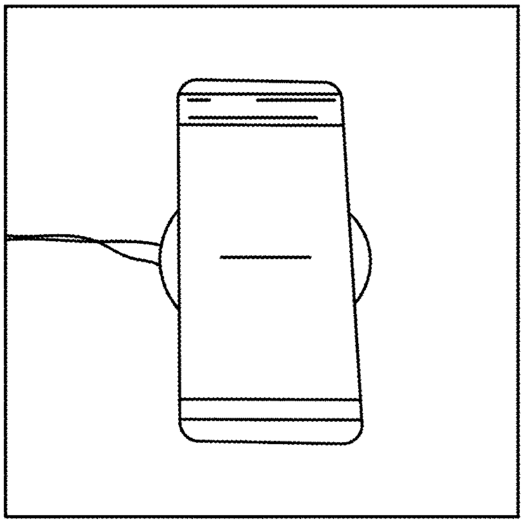
Figure 4C:
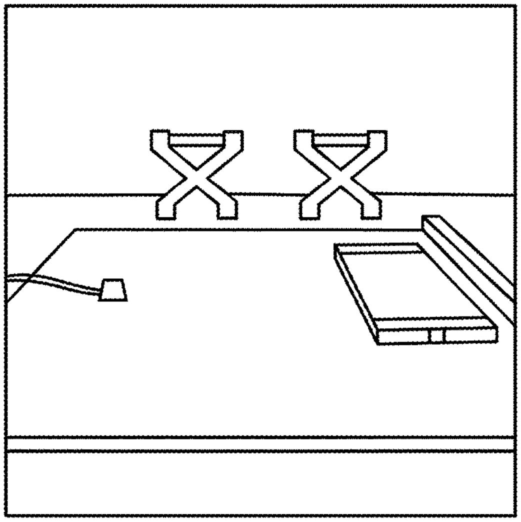
Figure 4D:
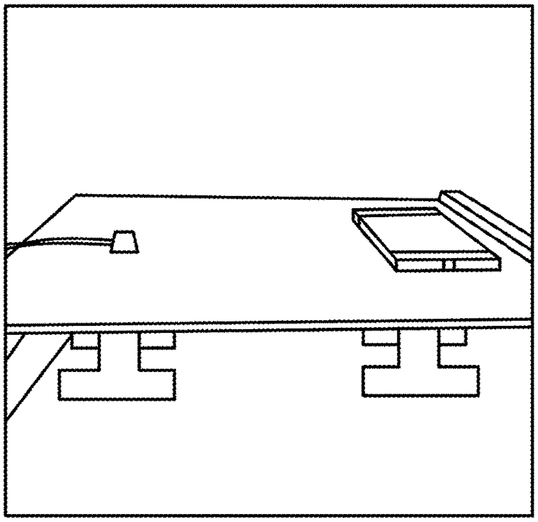

B.2—Vibration Mediums: Considering the importance of the shared physical surface in vibration signal propagation and data transmission accuracy, four mediums were tested. In the first experiment, a plastic stand made of ABS polymer, a common material used in manufactured products, was used. The piezo sensor was attached to the bottom of the plastic stand while the phone rested on top (FIG. 4A). In the second experiment, an off-the-shelf wireless charger to showcase a more pragmatic platform was used. The piezo sensor was attached to the charger's bottom while the phone rested on the top (FIG. 4B). In the third experiment, a 14"×12" aluminum sheet laid flat on a table (on-ground) was used. In these experiments, the smartphone and piezo sensor were placed on the opposite ends of the surface—approximately 17 cm apart (FIG. 4C). Finally, an elevated aluminum sheet resting on two pillars was used to evaluate the impacts of an off-ground transmission medium on vibration propagation. The sensor and the phone were placed above opposing posts, approximately 17 cm apart (FIG. 4D).

B.3—Variable and Environment Turning: The two-factor authentication system 10 performance was also explored using different configurations, such as distance and vibration intensity. A consistent setup was used for all the experiments and the results were averaged over 100 runs, with each run using a unique and randomized one-time code. In all experiments, one-time codes of length eight characters were used. Using shorter one-time codes adversely impacts the system's security, while using longer codes slightly increases the authentication latency. To distinguish two consecutive vibration signals, a silent period of 50 ms was used. Time granularity of less than 50 ms often leads to inaccurate recordings. The Hexadecimal encoding scheme was used, which resulted in the lookup table of 16 characters. In the experiments, the vibration periods began at the lowest viable vibration duration and increased by intervals of 20 ms. More specifically, the first character mapped to 45 ms of vibration, the second character mapped to 65 ms of vibration, and the last value that mapped to 345 ms of vibration.

B.4—Experiment Metrics: To assess the two-factor authentication system 10, success rate was considered as the primary evaluating metric. The success rate was the percentage of accepted attempts made by a legitimate user (true positive). In the experiments, the accuracy threshold as a system parameter was varied to enforce the expected similarity between the sent and received one-time codes. Various random-precision attacks, as discussed above, were also evaluated. The two-factor authentication system's equal error rate was also evaluated using its success rates on the best and worst vibration mediums along with the false acceptance rate of a 50% random-precision attacker.

C. Results and Analysis

The impact of the distance in vibration signal attenuation was also accessed. The distance between the smartphone and the piezo sensor was increased from 5 cm to 25 cm, representing common cases of users placing their smartphones on the desk and in close proximity to their computers. The collected results showed that the two-factor authentication system 10 maintained consistent success rates irrespective of the distance. Given the consistency across all experiments and the case's short-distance nature, distance was eliminated as a variable in the rest of the experiments. To assess the two-factor authentication system's usability, its end-to-end latency—the time elapsed from the user inserting their credential until they successfully logged into their account—was measured. It was observed that the two-factor authentication system's latency followed the normal distribution ~N(3.86 s, 0.332 s). In this regard, the two-factor authentication system outperformed SoundProof, which achieves authentication latency of 4.7 s.

Table II represents the two-factor authentication system's success rates for various accuracy thresholds. As expected from the two-factor authentication system's stringent similarity score evaluation, increasing the accuracy threshold to 90% or above adversely impacted the two-factor authentication system's acceptance rates and resulted in more false-negative events. When considering the background noise in the environment and the limited control on generating the vibration signal using restricted vibration APIs, achieving the 100% accuracy threshold is non-trivial. However, reducing the accuracy threshold to 81% drastically improved the acceptance rates across all mediums with a minimum value of 93% when using the elevated aluminum sheet. Adjusting the accuracy threshold to 75% resulted in at least a 99% success rate for the wireless charger and elevated aluminum sheet—representing a satisfactory user experience regardless of the vibration medium.

TABLE II

VIBE'S TRUE-POSITIVE ACROSS VARIOUS VIBRATION MEDIUMS. THE RESULTS ARE AVERAGED OVER 100 RUNS. NOTE THAT AN ACCURACY THRESHOLD OF 81% RESULTS IN THE MINIMUM 93% ACCEPTANCE RATE

| Accuracy Threshold | Plastic Stand | Wireless Charger | On-Ground Alloy Sheet | Elevated Alloy Sheet |
|---|---|---|---|---|
| 100% | 12% | 4% | 3% | 0% |
| 96% | 33% | 17% | 18% | 14% |
| 93% | 54% | 34% | 38% | 39% |
| 90% | 79% | 50% | 70% | 57% |
| 87% | 91% | 68% | 84% | 76% |
| 84% | 96% | 86% | 94% | 88% |
| 81% | 100% | 95% | 99% | 93% |
| 78% | 100% | 96% | 99% | 97% |
| 75% | 100% | 99% | 100% | 99% |
| 71% | 100% | 100% | 100% | 100% |
| 68% | 100% | 100% | 100% | 100% |

The second observation is concerning the suitability of various vibration mediums for vibration signal propagation. The experiments demonstrated that the plastic stand consistently performs better than other mediums in transmitting vibration signals—achieving a 100% acceptance rate (in more than 100 runs) with the 81% accuracy threshold. The on-ground aluminum sheet that was placed on the ground was ranked as the second-best medium, reaching a 100% acceptance rate with the 75% accuracy threshold. Finally, the wireless charger and the elevated aluminum sheet could maintain acceptable performance (99% acceptance rate) with the 75% threshold. A few alternative mediums were also experimented with for vibration propagation, including wooden, glass, and granite surfaces. However, given the testbed setup and available hardware, these surfaces performed poorly.

Table III includes the two-factor authentication system's false-positive rates using a random precision attacker conducted on the plastic stand as discussed above. Although none of the attacks shown any success at the 100% accuracy threshold, reducing the threshold to 81% and further 75% increased the successful login attempts of the most potent adversary (for the 75% accurate code) to 6% and 87%, respectively. It is noteworthy that such high false-positive rates are only possible if (i) the adversary can generate a random code that is highly similar to the original code and (ii) the adversary has the complete knowledge of the user's unique vibration lookup table—which was assumed in these experiments. In realistic scenarios, the adversary cannot access the user's vibration lookup table, which results in attack failure even if the adversary has access to the one-time code. The lower accuracy attacks (50% and 25% accurate codes) result in relatively lower false-positive rates—a maximum of 4% for a code with 50% similarity to the original code and the knowledge of the user's lookup table.

TABLE III

THE ATTACK SUCCESS RATES (FALSE-POSITIVE) UPPER BOUND FOR AN ADVERSARY THAT CAN GENERATE CODE WITH CERTAIN SIMILARITIES TO THE ORIGINAL CODE

| Accuracy Threshold | 75% Accurate Code | 50% Accurate Code | 25% Accurate Code |
|---|---|---|---|
| 100% | 0% | 0% | 0% |
| 96% | 3% | 0% | 0% |
| 93% | 9% | 0% | 0% |
| 90% | 16% | 0% | 0% |
| 87% | 32% | 0% | 0% |
| 84% | 56% | 1% | 0% |
| 81% | 66% | 2% | 0% |
| 78% | 80% | 3% | 0% |
| 75% | 87% | 4% | 0% |
| 71% | 90% | 9% | 1% |
| 68% | 97% | 15% | 2% |

Figure 5:
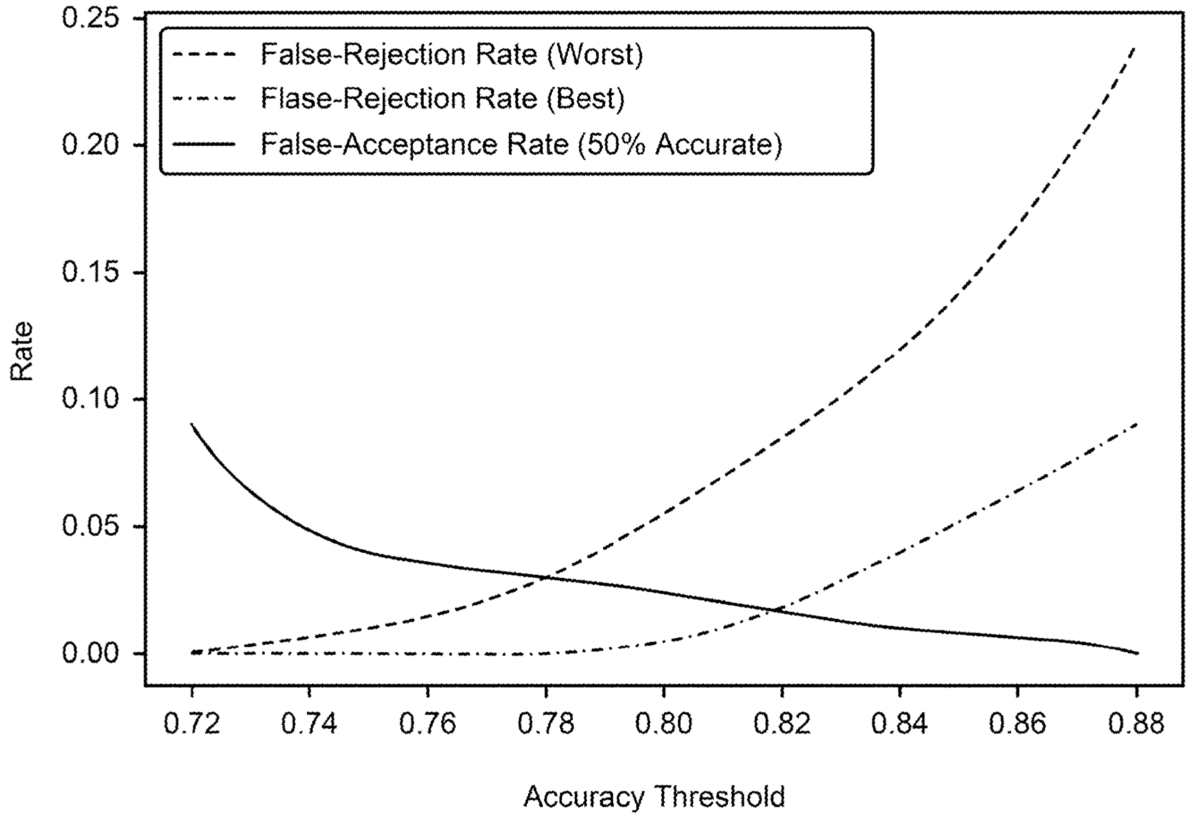
FIG. 5 is an accuracy threshold graph.

To assess the two-factor authentication system's equal error rate (EER), the 50% accurate attack scenario was chosen, as the 75% accurate attack represents a highly unrealistic attack. The 25% accurate attack was avoided to provide a fair evaluation. In assessing EER, the false-rejection rates of the best and worst mediums, plastic stand and aluminum sheet, respectively, were used. As shown in FIG. 5, the two-factor authentication system 10 achieved an EER of 0.0175 using the plastic stand and 0.03 when using the aluminum sheet. The resultant EER shows Vibe's advantages when compared to SoundAuth with ERR of 0.1389.

Therefore, the growing authentication attack vectors demand more sophisticated solutions for protecting online assets. The state-of-the-art in zero-effort 2FA utilizes the similarity of the smartphone and computer environments to prove their proximity and authentication legitimacy. The majority of such solutions, however, are vulnerable to co-located adversaries. The two-factor authentication system 10 described herein is a zero-effort 2FA scheme that uses a vibration medium to assess the proximity of a smartphone 18 and a computer 20. The two-factor authentication system 10 provides better security and other advantages when compared to other 2FA mechanisms. The two-factor authentication system's prototyped implementation using commodity hardware showed an end-to-end latency of approximately 3.86 seconds with an equal error rate of 0.0175. The two-factor authentication system 10 can also be augmented with a continuous authentication engine to cope with evolving attack vectors such as lunchtime attack and further explore acoustic friendly jamming approaches to eliminate sound-based adversaries.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

The invention claimed is:

1. A two-factor authentication system comprising:

a mobile device having a vibration element configured to generate a vibration sequence based on a unique vibration code received by the mobile device;

a two-factor authentication server communicatively coupled to the mobile device, the two-factor authentication server configured to generate and send the unique vibration code to the mobile device in response to the two-factor authentication server receiving a two-factor authentication request;

a vibration receiver configured to support the mobile device and communicatively coupled to the two-factor authentication server, the vibration receiver including a vibration sensor configured to detect the vibration sequence generated by the mobile device via a serial port based on the unique vibration code and generate a vibration authentication signal based on the detected vibration sequence;

wherein the two-factor authentication server is configured to receive the vibration authentication signal generated by the vibration receiver and authenticate the two-factor authentication request based on the received vibration authentication signal;

a computer communicatively coupled to the two-factor authentication server and the vibration receiver, the vibration receiver communicatively coupled to the two-factor authentication server via the computer; and a web server communicatively coupled to the computer and the two-factor authentication server, the web server configured to send the two-factor authentication request to the two-factor authentication server based on a user credential received by the web server from the computer.

2. The two-factor authentication system of claim 1, wherein the vibration sequence comprises a plurality of vibration pulses.

3. The two-factor authentication system of claim 2, wherein at least two vibration pulses of the plurality of vibration pulses have different time durations.

4. The two-factor authentication system of claim 2, wherein the vibration sequence includes a plurality of idle intervals, each idle interval is disposed between two adjacent vibration pulses of the plurality of vibration pulses.

5. The two-factor authentication system of claim 2, wherein the two-factor authentication server is configured to correlate the vibration authentication signal with the unique vibration code to determine whether or not to authenticate the two-factor authentication request.

6. The two-factor authentication system of claim 1, wherein the two-factor authentication server is configured to send an authentication signal to the web server after authenticating the two-factor authentication request based on the received vibration authentication signal.

7. A two-factor authentication method comprising:

sending, by a computer, a user credential to a web server, the computer communicatively coupled to a mobile device comprising a vibration element;

sending, by the web server, a two-factor authentication request to a two-factor authentication server in response to the web server receiving the user credential;

receiving, by the two-factor authentication sever, the two-factor authentication request;

sending, by the two-factor authentication server, a unique vibration code to the mobile device;

receiving, by a vibration receiver, a vibration sequence generated based on the unique vibration code;

generating, via the vibration receiver, a vibration authentication signal based on the vibration sequence; receiving, by the two-factor authentication server, the vibration authentication signal; and authenticating, via the two-factor authentication server, the two-factor authentication request based on the vibration authentication signal.

8. The method of claim 7, further comprising generating, via a vibration element, the vibration sequence based on the unique vibration code, wherein the vibration element is supported by the vibration receiver.

9. The method of claim 8, wherein said generating the vibration sequence includes generating a plurality of vibration pulses, at least two of the plurality of vibration pulses having different time durations.

10. The method of claim 9, wherein said generating the vibration sequence includes idling the vibration element between each two adjacent vibration pulses of the plurality of vibration pulses.

11. The method of claim 7, wherein said authenticating includes correlating, by the two-factor authentication server, the vibration authentication signal with the unique vibration code to determine whether or not to authenticate the two-factor authentication request.

12. The method of claim 7, wherein said authenticating includes sending an authentication signal to the web server after confirming, with the two-factor authentication server, the correlation between the vibration authentication signal and the unique vibration code.

* * * * *